(12) United States Patent
Lautenschlager et al.

(10) Patent No.: US 6,263,058 B1
(45) Date of Patent: Jul. 17, 2001

(54) CHARGE INFORMATION METHOD

(75) Inventors: Wolfgang Lautenschlager, Weissach-Flacht; Uwe Stahl, Leonberg, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/391,621

(22) Filed: Sep. 7, 1999

(30) Foreign Application Priority Data

Sep. 8, 1998 (DE) .............................................. 198 40 910

(51) Int. Cl.⁷ .................................................. H04M 15/00
(52) U.S. Cl. .......................... 379/114; 379/115; 379/121; 379/143; 379/229
(58) Field of Search .................................... 379/111, 112, 379/113, 114, 115, 133, 229, 230, 143, 121, 207

(56) References Cited

U.S. PATENT DOCUMENTS

| | | | |
|---|---|---|---|
| 4,726,056 | * 2/1988 | An et al. ................................ | 379/115 |
| 5,303,297 | * 4/1994 | Hillis .................................... | 379/111 |
| 5,420,914 | * 5/1995 | Blumhardt ............................ | 379/114 |
| 5,488,655 | * 1/1996 | Hamlen ................................. | 379/114 |
| 5,802,502 | * 9/1998 | Gell et al. ............................. | 705/37 |
| 5,930,343 | * 7/1999 | Vasquez ................................ | 379/115 |
| 6,044,259 | * 3/2000 | Hentila et al. ........................ | 455/406 |
| 6,104,792 | * 8/2000 | Lautenschlager et al. .......... | 379/114 |

FOREIGN PATENT DOCUMENTS

| | | | |
|---|---|---|---|
| WO 94/28683 | 12/1994 | (WO) | ............................... H04Q/3/00 |
| WO 97/05749 | 2/1997 | (WO) | ............................... H04M/3/42 |

OTHER PUBLICATIONS

Chapter II.3.4, "Fernvermittlungssysteme", G. Siegmund, Grundlagen der Vermittlungstechnik, 1991, pp. 92 to 94.

* cited by examiner

*Primary Examiner*—Curtis Kuntz
*Assistant Examiner*—Binh K. Tieu
(74) *Attorney, Agent, or Firm*—Sughrue, Mion, Zinn, Macpeak & Seas, PLLC

(57) ABSTRACT

The invention relates to a method of providing charge information and to a service control unit (SCP) for carrying out the method. During the establishment of a call from a calling subscriber (A) to a called subscriber (B), the service control unit (SCP) is triggered. From a plurality of network operators (OP1 to OP3) to whose tariff model data it has access, the service control unit (SCP) selects one or more network operators that provide a service for the call. Based on the tariff model data of the selected network operator or the selected network operators and on data about the calling and called subscribers (A, B), the service control unit (SCP) calculates a tariff for the call. It sends a signaling message (SM) containing a tariff identification assigned to the tariff to the terminal exchange (SUBSW) of the calling subscriber (A), which then sends charge information (SCP) to the calling subscriber (A) according to the tariff identification received from the service control unit (SCP).

15 Claims, 3 Drawing Sheets

CHARGE INFORMATION METHOD

BACKGROUND OF THE INVENTION

This invention relates to a method of providing charge information, and to a service control unit for providing charge information.

The invention starts from the method of providing charge information for the calling subscriber commonly used in present-day telecommunications networks, as is described, for example, in Chapter II.3.4, "Fernvermittlungssysteme", of a book by G. Siegmund, "Grundlagen der Vermittlungstechnik", R. v. Decker's Verlag, G. Schenk GmbH, Heidelberg, 1991, pages 92 to 94.

During a call initiated by the calling subscriber, metering pulses are sent from the terminal exchange associated with the subscriber over the subscriber line to the terminal of the subscriber in order to provide the latter with charge information. The metering pulses are transmitted in the bearer channel, and the number of pulses is a measure of the charge for the call. The metering pulses are generated by a metering-pulse generator of the subscriber terminal exchange, which is controlled by a translator located at the nodal switching center. This translator determines the route to be followed by the call and the metering zone associated with this route. The metering-pulse generator is controlled by the translator according to the metering zone determined.

This prior-art method does not work perfectly if the telecommunications network consists of two or more subnetworks of different network operators. If, during call establishment, for example, a network operator different from the access-network operator of the calling subscriber is selected, no metering pulses can be provided for this call since no charge signaling is standardized between network operators.

SUMMARY OF THE INVENTION

The object of the invention is to improve the provision of charge information in telecommunications networks.

This object is attained by a method of providing charge information to a subscriber of a telecommunications network formed by subnetworks associated with different network operators, wherein during the establishment of a call from said subscriber as a calling subscriber to a called subscriber, a service control unit is triggered, the service control unit selects from a plurality of network operators, to whose tariff model data it has access, one or more network operators who provide a service for the call, the service control unit calculates a tariff for the call based on the tariff model data of the selected network operator or the selected network operators and on data about the calling subscriber and the called subscriber, and the service control unit sends a signaling message including a tariff identification assigned to the tariff to the terminal exchange of the calling subscriber, which sends to the calling subscriber charge information in accordance with the tariff identification received from the service control unit.

The invention is further directed to a service control unit for use in this method.

The idea underlying the invention is to trigger, during call establishment, a service control unit which knows the tariff models of different network operators and, based on these operator-specific data, determines an operator-unspecific tariff identification for the call and signals this tariff identification to the terminal exchange of the calling subscriber. The terminal exchange then sends charge information to the subscriber in accordance with this tariff identification.

The advantage of the invention lies in the fact that the subscriber receives from his terminal exchange correct charge information even about calls for which charges are made by an outside network operator or by different network operators. At the same time, the existing charge information methods between subscriber and terminal exchange can be retained, so that existing terminals can be kept in use and the charge information will be presented to subscribers in the manner familiar to them.

Further advantages of the invention are that it can be incorporated into existing communications networks at low cost. No change of signaling standards is necessary. The solution is dynamically adaptable to new network-operator constellations without making any changes.

Preferred embodiments of the invention are apparent from the subclaims.

It is particularly advantageous to define a set of operator-unspecific tariffs that is used as a "tariff grid" in the service control unit and in the terminal exchanges. This reduces the signaling complexity and leads to a further considerable reduction of the cost of incorporating the invention into existing telecommunications networks. The grid need not permit precise mapping of a subscriber-specific tariff to a subscriber-unspecific tariff in any case. The resulting approximately correct charge information will generally be sufficient.

Furthermore, it is particularly advantageous if the network operators transmit their operator-specific tariff model data independently through a data network to the service control unit and if the service control unit generates a tariff model mapping matrix from these data. In this manner, very fast computation of the subscriber-unspecific tariff identification and a reduction of the computer capacity necessary therefor are achieved.

BRIEF DESCRIPTION OF THE DRAWING

The invention will become more apparent from the following description of several embodiments when taken in conjunction with the accompanying drawings, in which.

DETAILED DESCRIPTION OF THE INVENTION

Figure 1:
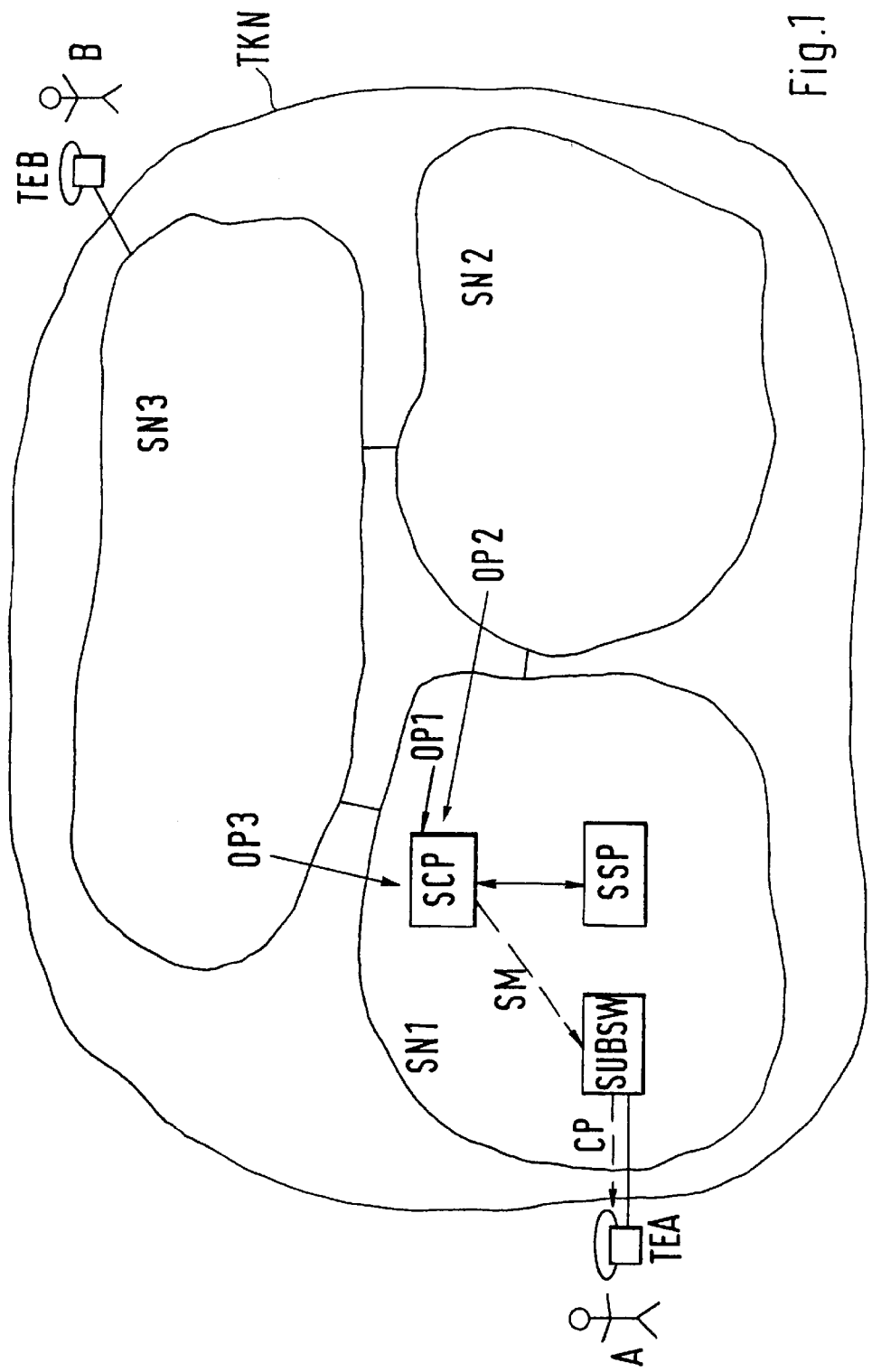
FIG. 1 is a block diagram of a telecommunications network with a service control unit according to the invention.

FIG. 1 shows a telecommunications network TKN with three subnetworks SN1 to SN3 as well as two terminals TEA and TEB associated with subscribers A and B, respectively.

The terminals TEA and TEB are telephone terminals.

The number of subnetworks SN1 to SN3 has been chosen as an example. The subnetworks SN1 to SN3 are conventional telephone networks, such as ISDN telephone networks (ISDN=integrated services digital network). They may also permit the establishment of data or video calls, or be mobile radio networks. The subnetworks SN1 to SN3 are interconnected, so that calls routed through two or more of the subnetworks SN1 to SN3 are possible.

The subnetworks SN1 to SN3 are assigned to different network operators OP1 to OP3, respectively. The subnetworks involved in a call provide services for the call, which consist of transmission services and other services, such as information services. For the services provided for the call, the respective network operators receive a charge from the subscriber or from another network operator, who, in turn, collects this charge from the subscriber.

The structure of the subnetworks SN1 to SN3 will now be described using the subnetwork SN1 as an example.

The subnetwork SN1 is formed by several interconnected exchanges. The subscriber terminals of the subnetwork SN1 are connected to the subnetwork SN1 via terminal exchanges. Of these terminal exchanges, one terminal exchange SUBSW, to which the terminal TEA is connected, is shown in FIG. 1 by way of example. The subnetwork SN1 further comprises one or more exchanges in the form of service switching points, of which one service switching point SSP is shown in FIG. 1 by way of example. It further includes a service control unit SCP, which is connected via the signaling network of the subnetwork SN1 to the service switching points of the subnetwork SN1. It is also possible that service switching points of different subnetworks access the service control unit SCP, or that the service switching points of the subnetwork SN1 access a service control unit of a network operator different from the network operator OP1 or a service control unit of a separate service provider. For example, the service switching points of all subnetworks SN1 to SN3 may access a central service control unit that is operated by a separate service provider.

When the service switching point SSP detects specific trigger events during the establishment of a call routed through it, it sends a service request message to the service control unit SCP, requesting the latter to provide the charge information service described in the following.

The following trigger events are particularly advantageous:

In a first embodiment, such a service request message is sent to the service control unit SCP for each call initiated by a subscriber of the subnetwork SN1 ("calling subscriber"). The occurrence of this trigger event can be detected by the service switching point SSP from the number of the calling subscriber.

In a second embodiment, such a service request message is sent to the service control unit SCP for each call that is initiated by a subscriber of the subnetwork SN1 ("calling subscriber") and routed to other network operators. The service switching point SSP can detect the occurrence of this trigger event from a prefix dialed by the calling subscriber and specifying the network operator for the call (carrier selection). The selection of the network operator may also be preset, so that calls from particular subscribers of the network SN1 will always be routed to another network operator (preselection). To the service switching point SSP, calls from such a subscriber then represent a trigger event which initiates the transmission of a service request message.

It is also possible for the service switching point SSP to detect the occurrence of this trigger event from the numbers of the calling or called subscribers.

This embodiment has the advantage that the service control unit SCP is activated, i.e., that the extra effort is made, only for those calls for which the existing charge information methods do not always work correctly.

In a third embodiment, such a service request message is sent to the service control unit SCP for each call initiated by a subscriber of a specific group of subscribers of the subnetwork SN1. The service switching point SSP can recognize this trigger event by the fact that the number of the calling subscriber is included on a list of specific numbers.

This makes it possible for the subscribers of the subscriber network SN1 to determine by themselves whether this new charge information service is to be made available to them or not. If they want to use this service, they will be entered in the list as members of the specific group of subscribers. For the provision of this service or for the entry in the list, an additional charge may be made. It is also advantageous to additionally check, as in the second embodiment, whether the call is to be routed to other network operators.

It is also possible, of course, to send a service request message to the service control unit SCP for all calls. Also, parts of the above-described selection logics may be moved to the service control unit SCP.

The service control unit SCP has access to the tariff model data of the network operators OP1 to OP3. These data are transmitted to it by the network operators OP1 to OP3. When the service control unit SCP is triggered by the reception of a service request message requesting the charge information service, it performs the following functions. The service control unit SCP selects from the network operators to whose tariff model data it has access, here the network operators OP1 to OP3, one or more network operators who provide a service for the call. This selection is made, for example, by interpreting the calling or called numbers associated with the call or by interpreting a prefix number. Based on the tariff model data of the selected network operator(s) and on data about the calling subscriber and the called subscriber, the service control unit SCP then calculates a network-operator-unspecific tariff to be assigned to the call. After that, it sends a signaling message SM containing a tariff identification assigned to the calculated tariff to the terminal exchange of the calling subscriber.

To provide the above-described functions, the service switching point SSP and the service control unit SCP are advantageously implemented in accordance with the IN architecture (IN=intelligent network).

A call between subscribers A and B is established as follows.

Subscriber A initiates a call request at his terminal TEA, which is sent to the terminal exchange SUBSW. With the call request, for example by dialing a particular prefix (carrier selection), the subscriber requests the establishment of a call to subscriber B through the subnetwork SN2 of network operator OP2, who is to act as the network operator that makes the charge for the call. The call request is routed from exchange to exchange through the subnetworks SN1 to SN3 according to the destination information contained in it, and a corresponding bearer channel is established between terminals TEA and TEB. The call request is routed through the service switching point SSP, which detects a trigger event and triggers the service control unit SCP for the call. The service control unit SCP selects from the network operators OP1 to OP2, to whose tariff model data it has access, the network operator OP2, who provides chargeable services for the call and makes the charge for the call. Next, the service control unit SCP calculates a tariff for the call based on the tariff model data of the selected network operator OP2 and on the telephone numbers of subscribers A and B. The service control unit SCP then sends a signaling message SM containing a tariff identification assigned to the tariff over the signaling network of the subnetwork SN1 to the terminal exchange SUBSW of the calling subscriber A. This signaling message controls the metering-pulse generator that is assigned in the terminal exchange SUBSW to the subscriber line connected to the terminal TEA. For the duration of the call between subscribers A and B, the metering-pulse generator generates metering pulses according to the tariff identification received with the signaling message. These metering pulses are sent as charge information CP from the terminal exchange SUBSW to the terminal TEA. The terminal exchange SUBSW may also send other charge information CP to the subscriber A, such as spoken announcements, charge data transmitted over the ISDN D channel, or texts to be displayed in ISDN terminals.

The structure and operation of the service control unit SCP will now be explained with the aid of FIG. 2.

Figure 2:
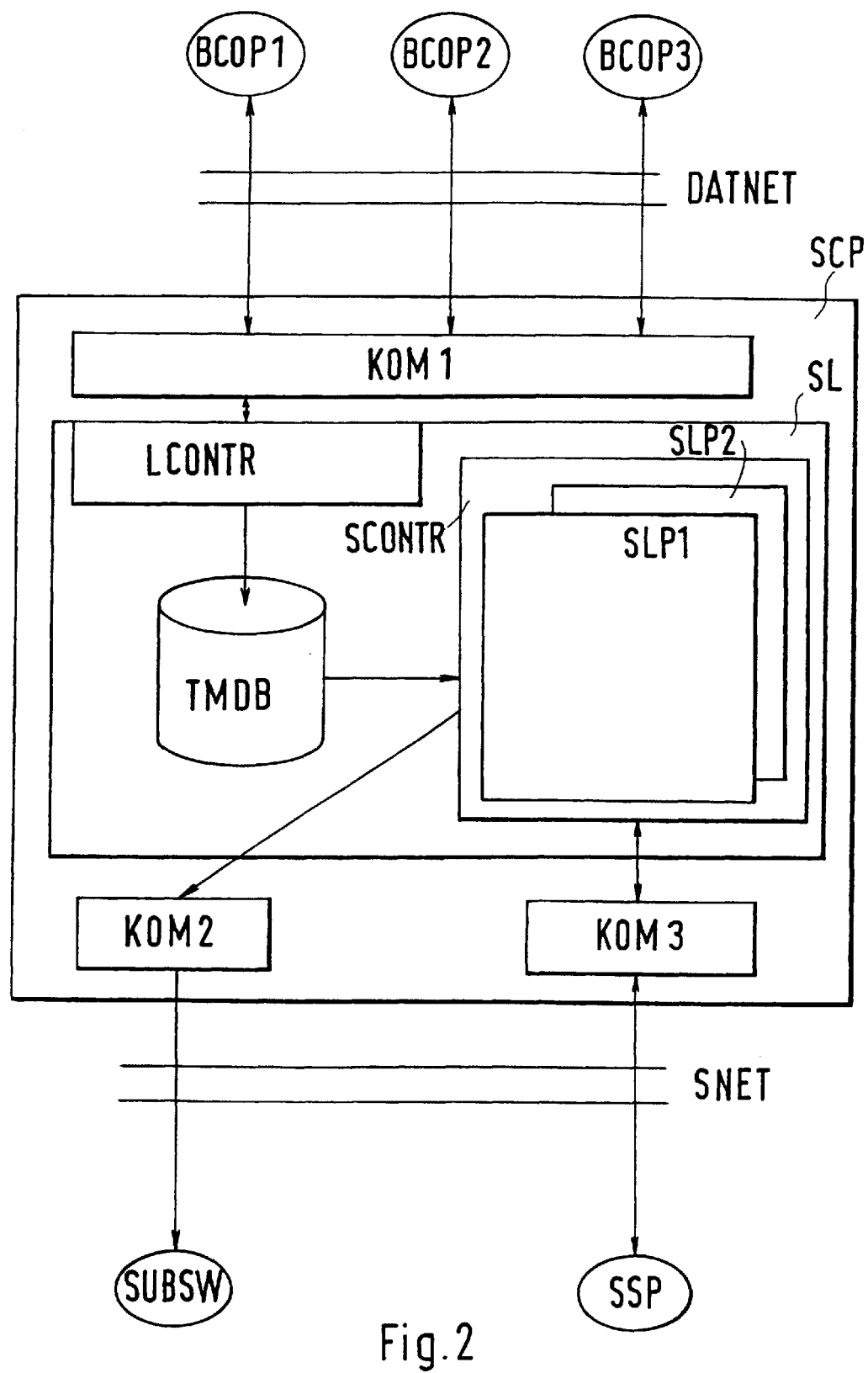
FIG. 2 is a functional diagram of a first embodiment of the service control unit of FIG. 1.

FIG. 2 shows the service control unit SCP, the subscriber terminal exchange SUBSW, the service switching point SSP, and three computers BCOP1 to BCOP3. The computers BCOP1 to BCOP3 communicate via a communications network DATNET with the service control unit SCP, which, in turn, communicates via a communications network SNET with the terminal exchange SUBSW and the service switching point SSP.

The computers BCOP1 to BCOP3 are computers of the billing centers of the network operators OP1 to OP3, respectively. Each of them contains the current tariff model of the respective network operator OP1 to OP3. The computers BCOP1 to BCOP3 have peripheral units which enable them to communicate via the communications network DATNET.

The communications network DATNET is the Internet. It may also be any other data network, for example a MAN, a LAN, an X.25 packet network, or a signaling network.

The service control unit SCP consists of one or more interconnected computer platforms for application programs that provide the functions of the service control unit SCP. From a functional point of view, the service control unit SCP comprises three communication units KOM1 to KOM3 and a service logic SL.

The communication unit KOM1 provides the necessary mechanisms for the communication with the computers BCOP1 to BCOP3. It provides, among other things, functions for processing the transport protocols used in the communications network DATNET as well as functions for processing the TCP/IP (Transmission Control Protocol/ Internet Protocol). Furthermore, it permits communication between the computers BCOP1 to BCOP3 and the service logic SL and enables the computers BCOP1 to BCOP3 to access the service logic SL. If the service control unit SCP is implemented in accordance with the IN architecture, this function is advantageously recognized using an authorized customer access.

The communications network SNET is the signaling network of the subnetwork SN1, which is implemented according to the ITU-T Signaling System No. 7, for example. The communications network SNET may also be a data network, such as a LAN or an ATM network.

The communication unit KOM3 performs functions which allow interaction with the service switching point of the subnetwork SN1, particularly with the service switching point SSP, via the communications network SNET. These functions comprise functions for processing the transport protocols used in the communications network SNET, for example the transport protocols of the Signaling System No. 7. Based on these functions are functions that process the TCAP (Transaction Capabilities Application Part) protocol of the ITU-T Signaling System No. 7 and the overlying INAP (Intelligent Network Applications Protocol), by means of which service switching functions and service control functions interact in accordance with the IN architecture. The messages exchanged in accordance with this protocol (INAP messages) as well as the basic services and actions of this protocol are explained, for example, in ITU-T Recommendation Q.1219, Chapter 6.5, "Intelligent Network Applications Protocol", pages 26 to 40, and, in more detail, in ITU-T Recommendation Q.1219 for IN CS-1.

The communication unit KOM2 serves to transmit signaling messages over the communications network SNET to the terminal exchanges of subnetwork SN1, particularly to the terminal exchange SUBSW. To this end, the communication unit KOM2 processes the transport protocols used in the communications network SNET, such as the transport protocols of the Signaling System No. 7. It is also possible to dispense with the communication unit KOM2. In that case, the service logic SL instructs the service switching point SSP, for example, to send such signaling messages to the terminal exchange. The service logic SL controls the provision of the charge information service. In addition to the service logic SL, the service control unit SCP may comprise further service logics that control other services. From a functional point of view, the service logic SL comprises two control units SCONTR and a storage unit TMDB.

The storage unit TMDB contains tariff model data of those network operators of the telecommunications network TKN whose tariff model data can be accessed by the service control unit SCP.

The control unit LCONTR, on the one hand, interacts with the computers BCOP1 to BCOP3, from which it receives tariff model data, and, on the other hand, controls the entry and updating of the tariff model data in the storage unit TMDB.

The storage unit TMDB can also be dispensed with, of course. In that case, the control unit SCONTR would request tariff model data directly from the control unit LCONTR, which, in turn, would send a corresponding request to one of the computers BCOP1 to BCOP3. The storage unit TMDB and the control unit LCONTR may also form part of a (central) computer to which the service control unit SCP is connected via a communications network.

The service logic SL is triggered for a call by a service request message that addresses the charge information service provided by the service logic. The triggering starts a service logic process which initiates the selection of the network operator(s), the calculation of a tariff for the call, and the transmission of a signaling message containing a tariff identification to a subscriber terminal exchange. When these functions have been provided for the call, the service logic process is terminated. In FIG. 2, two service logic processes SLP1 and SLP2 are shown by way of example; the charge information service provided by the service logic SL is thus being provided in parallel for two calls.

Next, a description will be given of a first way to calculate the tariff to be assigned to a call.

On each change of tariff, the computers BCOP1 to BCOP3 automatically send detailed tariff model data, which describe the respective operator's complete tariff model, to the control unit LCONTR. These tariff model data describe what charge (charge per unit of time, single charge) is made to a subscriber for what service (distance called, characteristics of the calling and called subscribers, type of service, . . .) under what conditions (time of day, network capacity utilization, . . . ). The control unit stores the received tariff model data as tariff model data of the respective network operator, overwriting any older tariff model data of the subscriber contained therein.

It is also possible for the computers BCOP1 to BCOP3 to transfer only that part of the detailed tariff model data to the control unit LCONTR which has changed. Furthermore, the control unit LCONTR may interrogate the computers BCOP1 to BCOP3 for tariff model data at regular intervals, and initiate changes in the storage unit TMDB when it detects changes in tariff models of subscribers.

Based on data contained in the call request, the control unit SCONTR selects from the network operators having their tariff model data stored in the storage unit TMDB the operator responsible for the call. The responsible network operator can be determined by the subscriber separately for each call, for example by dialing a given prefix. The network operator may also be preset for all calls of a particular subscriber, or the most favorable network operator may be determined and selected for each call.

From the network operators whose tariff model data are stored in the storage unit TMDB, network operators that provide a service for the call may also be selected by the control unit SCONTR based on the numbers of the calling and called subscribers, which are transmitted by the service switching point SSP to the control unit SCONTR. These network operators are advantageously those network operators or service providers that explicitly charge for services provided for the call defined by the calling and called numbers.

The control unit SCONTR then accesses the tariff model data of these selected network operators in the storage unit TMDB, and determines the network-operator-specific tariff for the call based on the information from the respective tariff model and on data about the calling subscriber and the called subscriber, particularly on their telephone numbers, and, according to the tariff, on other data, such as the time of day. The network-operator-specific tariff thus determined is then read in a network-operator-unspecific form, for example as a charge per unit of time, from the tariff model data. The tariffs thus calculated for the selected network operators are then added, and the resulting tariff for the call is assigned a tariff identification that can be understood by the terminal exchanges, since it is defined in the same manner. Such a tariff identification is constituted by a parameter defined by both sides, such as an integer value indicating the charge per unit of time or a value addressing a tariff defined by both sides.

The tariff identification can be transported, for example, as a charge band number in a no. 7 signaling message.

The control unit SCONTR may assign a tariff from a set of predefined tariffs agreed between the service control unit SCP and the terminal exchanges to the sum of tariffs calculated for the selected network operators, i.e., it may map the result of the tariff calculation onto a tariff grid. This has the advantage that only a correspondingly smaller set of tariff identifications has to be agreed between the service control unit and the terminal exchanges, thus permitting simpler addressing of tariffs defined by both sides. The tariff grid, and thus the set of tariffs, may be defined so that correct mapping is not possible in any case, so that only approximately correct charge information is provided.

The set of predefined tariffs agreed between the service control unit and the terminal exchanges may consist of the network-operator-specific tariffs of the network operator that specifies the terminal exchange of the calling subscriber. The control unit SCONTR thus maps the network-operator-specific tariffs of the selected network operator onto the network-operator-specific tariff grid of the terminal exchange operator.

This has the advantage that for the integration of the invention, only minor adaptations have to be made in the terminal exchanges.

Next, a second way to calculate the tariff to be assigned to a call will be described.

On each change of tariff, the computers BCOP1 to BCOP3, automatically or by direction of the respective network operator OP1, OP2, OP3, send tariff model data to the control unit LCONTR. From these tariff model data, the control unit LCONTR calculates a tariff model mapping matrix which maps the network-operator-specific tariffs of the network operators OP1 to OP3 onto a respective tariff of a set of predefined tariffs agreed between the service control unit and the terminal exchanges. By means of this mapping matrix, network-operator-specific tariffs are thus mapped onto a network-operator-unspecific tariff grid. The tariff model data of the network operators are available in the storage unit in conditioned form, and the amount of computation to be performed by the control unit SCONTR is reduced. In the tariff model mapping matrix, the respective operator-unspecific tariff identification to be assigned to an operator-specific tariff may already be associated with this tariff.

It is also possible that the computers BCOP1 to BCOP3 themselves fix the portion of the tariff model mapping matrix assigned to their respective network operators, and thus determine by themselves which tariffs of the tariff grid to assign, possibly approximatively, to which of their tariffs.

Another possible structure of the service control unit according to the invention and another possible implementation of the method according to the invention will now be explained with reference to FIG. 3.

Figure 3:
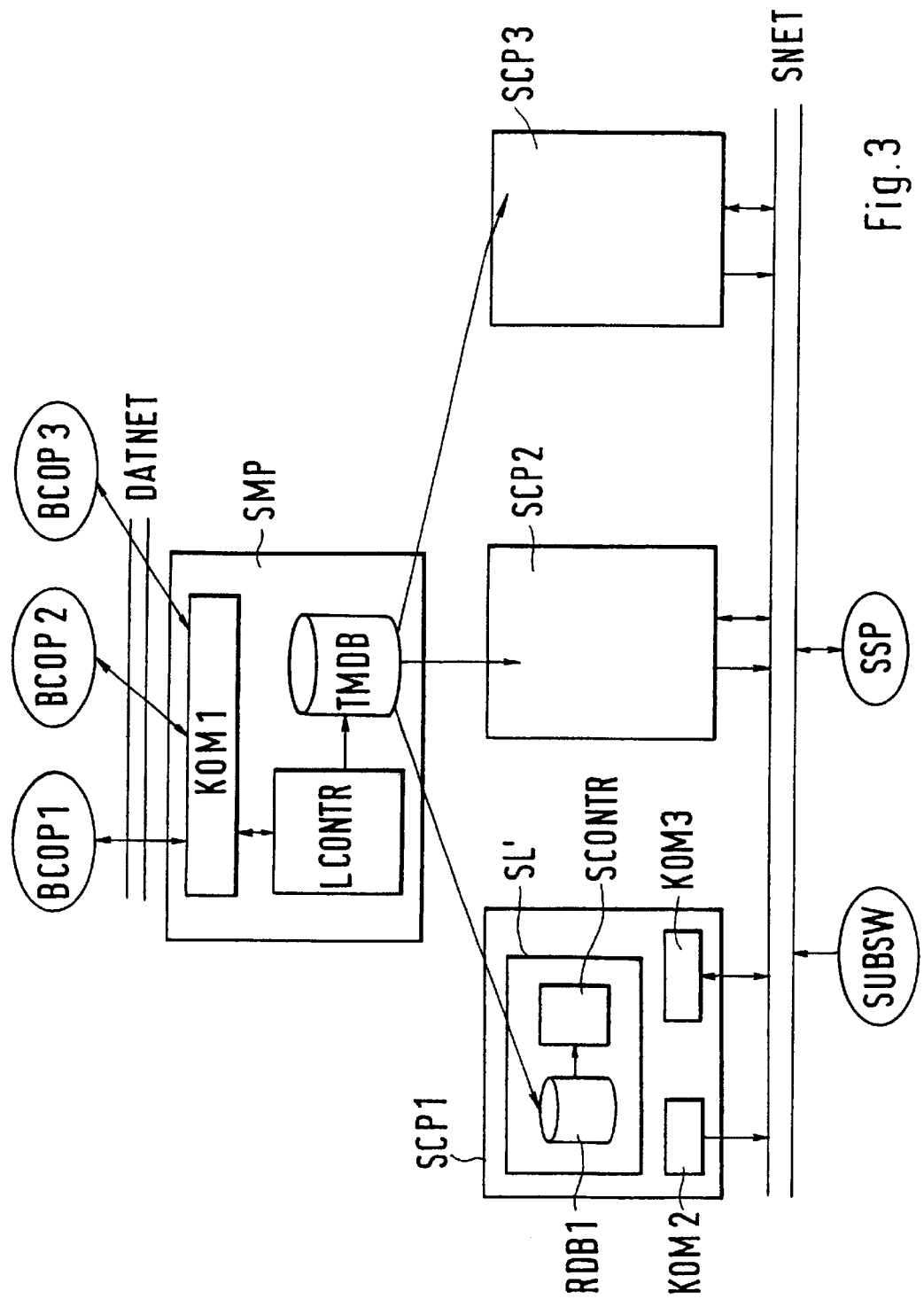
FIG. 3 is a functional diagram of a second embodiment of the service control unit of FIG. 1.

FIG. 3 shows three service control units SCP1 to SCP3, the terminal exchange SUBSW, the service switching point SSP, the three computers BCOP1 to BCOP3, and a service management unit SMP. The computers BCOP1 to BCOP3 communicate via the communications network DATNET with the service management unit SMP, which, in turn, communicates with the service control units SCP1 to SCP3. The number of service control units SCP1 to SCP3 has been chosen by way of example. They communicate via the communications network SNET with terminal exchanges and service switching points, for example with the terminal exchange SUBSW and the service switching point SSP.

The service management unit SMP is formed by one or more interconnected computers that perform service management functions for the service control units SCP1 to SCP3. It is constructed in accordance with the IN architecture, for example. In addition to these functions, the communication unit KOM1, the control unit LCONTR, and the storage unit TMDB of FIG. 2 are incorporated in the service management unit SMP.

The structure of the service control units SCP1 to SCP3 will now be described using the service control unit SCP1 as an example.

The service control unit SCP1 is constructed like the service control unit SCP of FIG. 2, with the difference that it comprises a service logic SL' containing, besides the control unit SCONTR of FIG. 2, a storage unit RDB1 in the form of a real-time data base. In this embodiment, the storage unit TMDB acts as a master data base which supplies the storage unit RDB1 and the corresponding storage units of the service control units SCP1 to SCP3 with tariff model data.

What is claimed is:

1. A method of providing charge information (CP) to a subscriber (A) of a telecommunications network (TKN) formed by subnetworks (SN1 to SN3) associated with different network operators (OP1 to OP3), characterized in that during the establishment of a call from said subscriber as a calling subscriber (A) to a called subscriber (B), a service control unit (SCP) is triggered, that the service control unit (SCP) selects from a plurality of network operators (OP1 to OP3), to whose tariff model data it has access, one (OP2) or more network operators who provide a service for the call, that the service control unit (SCP) calculates a tariff for the call based on the tariff model data of the selected network operator (OP2) or the selected network operators and on data about the calling subscriber (A) and the called subscriber (B), and that the service control unit (SCP) sends a signaling message (SM) including a tariff identification assigned to the tariff to the terminal exchange (SUBSW) of the calling subscriber (A), which sends to the calling subscriber (A) charge information (CP) in accordance with the tariff identification received from the service control unit (SCP), wherein a service management unit (SMP) determines, from transmitted tariff model data, a tariff model mapping matrix which maps network-operator-specific tariffs of the plurality of network operators (OP1 to OP3), to whose tariff model data the service control unit (SCP1 to SCP3) has access, to a respective tariff of a set of predefined tariffs agreed between the service control unit (SCP1 to SCP3) and the terminal exchange (SUBSW), and that the service management unit (SMP) communicates the determined tariff model mapping matrix as tariff model data to the service control unit (SCP1 to SCP3).

2. A method as claimed in claim 1, characterized in that during the calculation of the tariff, the service control unit (SCP) selects a tariff from a set of predefined tariffs agreed between the service control unit (SCP) and the terminal exchange (SUBSW), and sends a tariff identification assigned to the selected tariff to the terminal exchange (SUBSW).

3. A method as claimed in claim 2, characterized in that the set of tariffs is predefined so that the charge information is approximately correct.

4. A method as claimed in claim 1, characterized in that in order to make the selection, the service control unit (SCP) determines that network operator (OP2) or those network operators who make a charge for the call.

5. A method as claimed in claim 1, characterized in that the service control unit (SCP) selects the subscriber-selected network operator (OP2) as the network operator from the plurality of network operators (OP1 to OP3) to whose tariff model data it has access.

6. A method as claimed in claim 1, characterized in that the tariff model data of those network operators (OP1 to OP3) to whose tariff model data the service control unit has access are transmitted from a computer (BCOP1 to BCOP3) associated with the respective network operator to the service control unit (SCP).

7. A method as claimed in claim 5, characterized in that the tariff model data are transmitted to the service control unit (SCP) via an IN customer access.

8. A method as claimed in claim 1, characterized in that the service control unit (SCP) determines from transmitted tariff model data a tariff model mapping matrix which maps network-operator-specific tariffs of the plurality of network operators (OP1 to OP3), to whose tariff model data the service control unit (SCP) has access, to a respective tariff of a set of predefined tariffs agreed between the service control unit (SCP) and the terminal exchange (SUBSW).

9. A method as claimed in claim 1, characterized in that the tariff model data transmitted to the service control unit (SCP) are data from a computer (BCOP1 to BCOP3) associated with a network operator (OP1 to OP3) which map network-operator-specific tariffs to a respective tariff of a set of predefined tariffs agreed between the service control unit (SCP) and the terminal exchange (SUBSW), and that the service control unit (SCP) forms a tariff model mapping matrix from said data.

10. A method as claimed in claim 8, characterized in that during the calculation of the tariff for the call based on the data about the calling subscriber (A) and the called subscriber (B), the service control unit (SCP) determines a respective network-operator-specific tariff, and maps said network-operator-specific tariff by means of the tariff model mapping matrix onto one tariff of a set of predefined tariffs.

11. A method as claimed in claim 1, characterized in that the charge information (CP) sent by the terminal exchange (SUBSW) to the calling subscriber (A) is in the form of metering pulses.

12. A method as claimed in claim 1, characterized in that the service control unit (SCP) is triggered only if the calling subscriber (A) and the called subscriber (B) are associated with different network operators.

13. A method as claimed in claim 1, characterized in that the service control unit (SCP) is triggered only if the calling subscriber (A) is defined as a user of the service for providing charge information.

14. A telecommunications network (TKN) comprising:
subnetworks (SN1 to SN3) associated with different network operators (OP1 to OP3);
service control unit (SCP; SCP1 to SCP3) for providing charge information (CP), characterized in that the service control unit (SCP; SCP1 to SCP3) comprises a service logic (SL, SL') designed so that, when being triggered during the establishment of a call from a calling subscriber (A) to a called subscriber (B), it selects one (OP2) or more network operators providing a service for the call from a plurality of network operators (OP1 to OP3) to whose tariff model data it has access, that the service control unit (SCP; SCP1 to SCP3) then calculates a tariff for the call based on the tariff model data of the selected network operator (OP2) or the selected network operators and on data about the calling subscriber (A) and the called subscriber (B), and that the service control unit (SCP; SCP1 to SCP3) then causes a signaling message (SM) including a tariff identification assigned to the tariff to be sent to the terminal exchange (SUBSW) of the calling subscriber (A) and causes said terminal exchange to send charge information (CP) to the calling subscriber (A) in accordance with the received tariff identification; and
a service management unit (SMP) which determines, from transmitted tariff model data, a tariff model mapping matrix which maps network-operator-specific tariffs of the plurality of network operators (OP1 to OP3), to whose tariff model data the service control unit (SCP; SCP1 to SCP3) has access, to a respective tariff of a set of predefined tariffs agreed between the service control unit (SCP; SCP1 to SCP3) and the terminal exchange (SUBSW), and that the service management unit (SMP) communicates the determined tariff model mapping matrix as tariff model data to the service control unit (SCP; SCP1 to SCP3).

15. A method as claimed in claim 1, characterized in that during the calculation of the tariff for the call based on the data about the calling subscriber (A) and the called subscriber (B), the service control unit (SCP) determines a respective network-operator-specific tariff, and maps said network-operator-specific tariff by means of the tariff model mapping matrix onto one tariff of a set of predefined tariffs.

* * * * *